US012605890B2

(12) United States Patent (10) Patent No.: US 12,605,890 B2

Tsunoya (45) Date of Patent: Apr. 21, 2026

(54) PLASTICIZED MATERIAL SUPPLY DEVICE AND THREE-DIMENSIONAL SHAPING DEVICE

(71) Applicant: SEIKO EPSON CORPORATION, Tokyo (JP)

(72) Inventor: Akihiko Tsunoya, Okaya (JP)

(73) Assignee: SEIKO EPSON CORPORATION (JP)

( * ) Notice: Subject to any disclaimer, the term of this patent is extended or adjusted under 35 U.S.C. 154(b) by 282 days.

(21) Appl. No.: 18/298,440

(22) Filed: Apr. 11, 2023

(65) Prior Publication Data

US 2023/0321907 A1 Oct. 12, 2023

(30) Foreign Application Priority Data

Apr. 12, 2022 (JP) ................................. 2022-065562

(51) Int. Cl.
| | |
|---|---|
| *B29C 64/209* | (2017.01) |
| *B29C 64/20* | (2017.01) |
| *B29C 64/321* | (2017.01) |
| *B29C 64/336* | (2017.01) |
| *B29C 64/343* | (2017.01) |

(Continued)

(52) U.S. Cl.
CPC ............ *B29C 64/209* (2017.08); *B29C 64/20* (2017.08); *B29C 64/321* (2017.08); *B29C 64/336* (2017.08); *B29C 64/343* (2017.08); *B29K 2101/12* (2013.01); *B33Y 30/00* (2014.12)

(58) Field of Classification Search
CPC ..... B29C 64/20; B29C 64/209; B29C 64/321; B29C 64/336; B29C 64/342; B33Y 30/00; B33Y 40/00
See application file for complete search history.

(56) References Cited

U.S. PATENT DOCUMENTS

| | | | | |
|---|---|---|---|---|
| 3,896,029 A | * | 7/1975 | Beuselinck | ........... B29C 48/694 |
| | | | | 137/625.19 |
| 2020/0016833 A1 | * | 1/2020 | Yuwaki | .................. B33Y 70/10 |

(Continued)

FOREIGN PATENT DOCUMENTS

| | | | | |
|---|---|---|---|---|
| CN | 205058625 U | | 3/2016 | |
| CN | 108673894 A | * | 10/2018 | ........... B29C 64/209 |

(Continued)

*Primary Examiner* — Jerzi H Moreno Hernandez
(74) *Attorney, Agent, or Firm* — Harness, Dickey & Pierce, P.L.C.

(57) ABSTRACT

A plasticized material supply device includes: a nozzle configured to discharge a plasticized material toward a stage; a first flow path through which a first plasticized material flows; a second flow path through which a second plasticized material flows; a third flow path through which the plasticized material flows; a flow rate adjusting mechanism provided at a junction of the first flow path, the second flow path, and the third flow path, and configured to adjust a discharge amount of the plasticized material from the nozzle; and a control unit configured to control the flow rate adjusting mechanism. The flow rate adjusting mechanism includes a butterfly valve formed by processing a part of a drive shaft disposed along a direction intersecting a direction in which the third flow path extends, and a drive motor configured to rotate the butterfly valve by rotating the drive shaft.

10 Claims, 6 Drawing Sheets

(51) Int. Cl.
  *B29K 101/12*    (2006.01)
  *B33Y 30/00*    (2015.01)

(56)      References Cited

U.S. PATENT DOCUMENTS

| | | | | |
|---|---|---|---|---|
| 2020/0139624 | A1* | 5/2020 | Khondoker | B29C 64/118 |
| 2020/0164589 | A1* | 5/2020 | Yuwaki | B22F 12/57 |
| 2020/0269491 | A1 | 8/2020 | Fujimori et al. | |
| 2022/0219391 | A1* | 7/2022 | Asgeirsson | B29C 64/295 |

FOREIGN PATENT DOCUMENTS

| | | |
|---|---|---|
| CN | 110774577 A | 2/2020 |
| JP | 2020-131685 A | 8/2020 |

* cited by examiner 1000,1000a 120a 120b 130a 130b

142

400

CONTROL PART

631

141

M

100

632

600

143

M 110
111 610,620 700

210

200

310

320

330

300

Z
Y X

1000

120a

120b 130a    130b 501         620         502

400

CONTROL PART

PLASTICIZED MATERIAL SUPPLY DEVICE AND THREE-DIMENSIONAL SHAPING DEVICE

The present application is based on, and claims priority from JP Application Serial Number 2022-065562, filed Apr. 12, 2022, the disclosure of which is hereby incorporated by reference herein in its entirety.

BACKGROUND

1. Technical Field

The present disclosure relates to a plasticized material supply device and a three-dimensional shaping device.

2. Related Art

JP-A-2020-131685 discloses a configuration of a three-dimensional shaping device that includes a first shaping unit and a second shaping unit and shapes a three-dimensional shaped object using two different types of materials without replacing a material accommodated in a material supply part.

However, in the technique disclosed in JP-A-2020-131685, it is necessary to calibrate a positional relationship between the shaping units, and a shaped object for calibration is formed on a stage. Accordingly, a material consumption amount may be increased, and the shaped object may be deformed due to the material, leading to a degradation of the calibration accuracy.

SUMMARY

A plasticized material supply device to be used in a three-dimensional shaping device includes: a nozzle including a nozzle opening and configured to discharge a plasticized material, which is obtained by plasticizing a thermoplastic resin, toward a stage; a first flow path through which a first plasticized material constituting the plasticized material flows; a second flow path through which a second plasticized material constituting the plasticized material flows; a third flow path that communicates with the nozzle opening and through which the plasticized material flows; a flow rate adjusting mechanism provided at a junction of the first flow path, the second flow path, and the third flow path, and configured to adjust a discharge amount of the plasticized material from the nozzle; and a control part configured to control the flow rate adjusting mechanism. The flow rate adjusting mechanism includes a butterfly valve formed by processing a part of a drive shaft disposed along a direction intersecting a direction in which the third flow path extends, and a first drive part configured to rotate the butterfly valve by rotating the drive shaft.

A three-dimensional shaping device includes: a plasticizing part configured to plasticize a plasticized material; a stage including a shaping region on which the plasticized material is to be deposited; a discharge part configured to discharge the plasticized material toward the shaping region; a moving mechanism configured to move the discharge part relatively to the stage; and a control part. The discharge part includes a nozzle including a nozzle opening and configured to discharge the plasticized material, which is obtained by plasticizing a thermoplastic resin, toward the stage, a first flow path through which a first plasticized material flows, a second flow path through which a second plasticized material flows, a third flow path that communicates with the nozzle opening and through which the plasticized material flows, and a flow rate adjusting mechanism provided at a junction of the first flow path, the second flow path, and the third flow path, and including a butterfly valve configured to adjust a discharge amount of the plasticized material from the nozzle. The plasticizing part includes a first plasticizing part configured to supply the first plasticized material to the first flow path, and a second plasticizing part configured to supply the second plasticized material to the second flow path.

BRIEF DESCRIPTION OF THE DRAWINGS

FIG. 5 is a cross-sectional view illustrating a configuration of a pressure adjusting mechanism.

FIG. 6 is another cross-sectional view illustrating the configuration of the pressure adjusting mechanism.

DESCRIPTION OF EXEMPLARY EMBODIMENTS

In each of the following drawings, three axes orthogonal to one another will be described as an X axis, a Y axis, and a Z axis. A direction along the X axis is defined as an "X direction", a direction along the Y axis is defined as a "Y direction", and a direction along the Z axis is defined as a "Z direction". A direction indicated by an arrow is defined as a +direction, and a direction opposite to the +direction is defined as a – direction. A +Z direction may be referred to as "upper" or "upper side", a –Z direction may be referred to as "lower" or "lower side", and a view from the +Z direction is also referred to as a plan view. Description is made on the assumption that a surface on a +Z direction side is an upper surface and a surface on a –Z direction side opposite to the +Z direction side is a lower surface.

First, a configuration of a three-dimensional shaping device 1000 will be described with reference to FIGS. 1 and 2.

Figure 1:
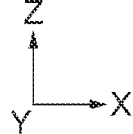
FIG. 1 is a cross-sectional view illustrating a configuration of a three-dimensional shaping device.
Figure 2:
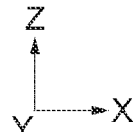
FIG. 2 is a cross-sectional view illustrating a positional relationship between a three-dimensional shaped object and a nozzle.

As illustrated in FIGS. 1 and 2, the three-dimensional shaping device 1000 includes a head 100 as a discharge part, a stage 200, a moving mechanism 300, and a control part 400.

The three-dimensional shaping device 1000 drives the moving mechanism 300 to change a relative position between the head 100 and the stage 200 while discharging a plasticized material 500 (see FIG. 2), which is obtained by plasticizing a thermoplastic resin, from the head 100 toward the stage 200. Accordingly, the three-dimensional shaping device 1000 shapes a three-dimensional shaped object having a desired shape on the stage 200.

The head 100 includes, for example, a nozzle 110, material supply parts 120a and 120b, a first plasticizing part 130a, and a second plasticizing part 130b. The nozzle 110 has a nozzle opening 111 at a tip thereof, and discharges the plasticized material 500 from the nozzle opening 111 toward a shaping region 210 of the stage 200.

A pellet-shaped material, a powdery material, or a filament-shaped material is fed into the material supply parts 120a and 120b. The material supply parts 120a and 120b supply a material serving as a raw material to the plasticizing parts 130a and 130b. For example, an acrylonitrile butadiene styrene (ABS) resin is fed into the material supply part 120a. For example, a polystyrene (PS) resin is fed into the material supply part 120b.

The plasticizing parts 130a and 130b plasticize the materials in a solid state supplied from the material supply parts 120a and 120b to generate the plasticized material 500 in a paste form having fluidity. A first plasticized material 501 plasticized by the first plasticizing part 130a flows through a first flow path 141 and is supplied to a third flow path 143. A second plasticized material 502 plasticized by the second plasticizing part 130b flows through a second flow path 142 and is supplied to the third flow path 143.

The term "plasticize" is a concept including melting or lowering the viscosity, and refers to changing from a solid state to a state of having fluidity. Specifically, in a case of a material in which glass transition occurs, the "plasticize" refers to setting a temperature of the material to be equal to or higher than a glass transition point. In a case of a material in which the glass transition does not occur, the "plasticize" refers to setting the temperature of the material to be equal to or higher than a melting point.

The plasticized material 500 such as the first plasticized material 501 and the second plasticized material 502 is supplied to the nozzle opening 111 communicating with the third flow path 143. A flow rate adjusting mechanism 600 that adjusts a discharge amount of the plasticized material 500 from the nozzle 110 is disposed at a junction of the first flow path 141, the second flow path 142, and the third flow path 143.

The flow rate adjusting mechanism 600 includes a butterfly valve 620 in which a part of a drive shaft 610 is processed and arranged along the Y direction that is a direction intersecting the Z direction that is a direction in which the third flow path 143 extends. The flow rate adjusting mechanism 600 further includes a drive motor 631 as a first drive part that rotates the butterfly valve 620 by rotating the drive shaft 610.

A pressure adjusting mechanism 700 is disposed between the nozzle 110 and the flow rate adjusting mechanism 600 in the third flow path 143. For example, the pressure adjusting mechanism 700 prevents leakage of the plasticized material 500 from the nozzle 110, which will be described in detail later. The pressure adjusting mechanism 700 includes a drive motor 632 as a second drive part.

The drive motors 631 and 632 are, for example, servo motors. The drive motors 631 and 632 are controlled by the control part 400.

The head 100 is provided with a heater (not illustrated). The heater heats the plasticized material 500. An output of the heater is controlled by the control part 400.

The stage 200 is provided below the nozzle 110. The stage 200 is, for example, a rectangular parallelepiped in shape. The stage 200 has the shaping region 210. The plasticized material 500 is discharged from the head 100 to the shaping region 210. The shaping region 210 is a region on an upper surface of the stage 200. The shaping region 210 is determined by a position of the nozzle opening 111 of the head 100.

For example, when the stage 200 is moved in an X-axis direction and a Y-axis direction by the moving mechanism 300, an end of the shaping region 210 in a −X-axis direction is located below the nozzle opening 111 at the time when the stage 200 is moved furthest in a +X-axis direction. An end of the shaping region 210 in the +X-axis direction is located below the nozzle opening 111 at the time when the stage 200 is moved furthest in the −X-axis direction.

The moving mechanism 300 supports the stage 200. The moving mechanism 300 moves the stage 200 and the head 100 relative to each other. For example, the moving mechanism 300 changes the relative position between the stage 200 and the head 100 in the X-axis direction and the Y-axis direction by moving the stage 200 in the X-axis direction and the Y-axis direction. Further, the moving mechanism 300 changes the relative position between the stage 200 and the head 100 in a Z-axis direction by moving the head 100 in the Z-axis direction.

The moving mechanism 300 includes, for example, a first electric actuator 310, a second electric actuator 320, and a third electric actuator 330. The first electric actuator 310 moves the stage 200 in the X-axis direction. The second electric actuator 320 moves the stage 200 in the Y-axis direction. The third electric actuator 330 moves the stage 200 in the Z-axis direction.

The control part 400 controls the flow rate adjusting mechanism 600 and the pressure adjusting mechanism 700 via the drive motors 631 and 632. In addition, the control part 400 controls the moving mechanism 300. The control part 400 is implemented by, for example, a computer including a processor, a storage unit, and an input/output interface for exchanging signals with the outside. For example, the control part 400 exerts various functions by the processor executing a program stored in the storage unit. Specifically, the control part 400 controls the head 100, the moving mechanism 300, and the like based on shaping data. The control part 400 may be implemented by a combination of a plurality of circuits instead of a computer.

The shaping data is created by, for example, causing a slicer software installed in a computer coupled to the three-dimensional shaping device 1000 to read shape data. The shape data is data representing a target shape of a three-dimensional shaped object created using three-dimensional computer aided design (CAD) software, three-dimensional computer graphics (CG) software, and the like. As the shape data, for example, data in a standard triangulated language (STL) format or an additive manufacturing file format (AMF) is used. The slicer software divides the target shape of the three-dimensional shaped object into layers having a predetermined thickness, and creates shaping data for each layer. The shaping data is represented by a G code or the like.

The shaping data includes, for example, information on a movement path of the nozzle 110 with respect to the stage 200, an amount of the plasticized material 500 to be discharged from the nozzle 110, a shape and area of each of a plurality of shaping layers constituting the three-dimensional shaped object, and the like. The control part 400 acquires the shaping data from the computer coupled to the three-dimensional shaping device 1000 or from a recording medium such as a universal serial bus (USB) memory.

In the three-dimensional shaping device 1000 described above, a configuration including the nozzle 110, the first flow path 141, the second flow path 142, the third flow path 143, the flow rate adjusting mechanism 600, and the control part 400 is referred to as a plasticized material supply device 1000*a*.

Next, a configuration of the flow rate adjusting mechanism 600 will be described with reference to FIGS. 3 and 4.

Figure 3:
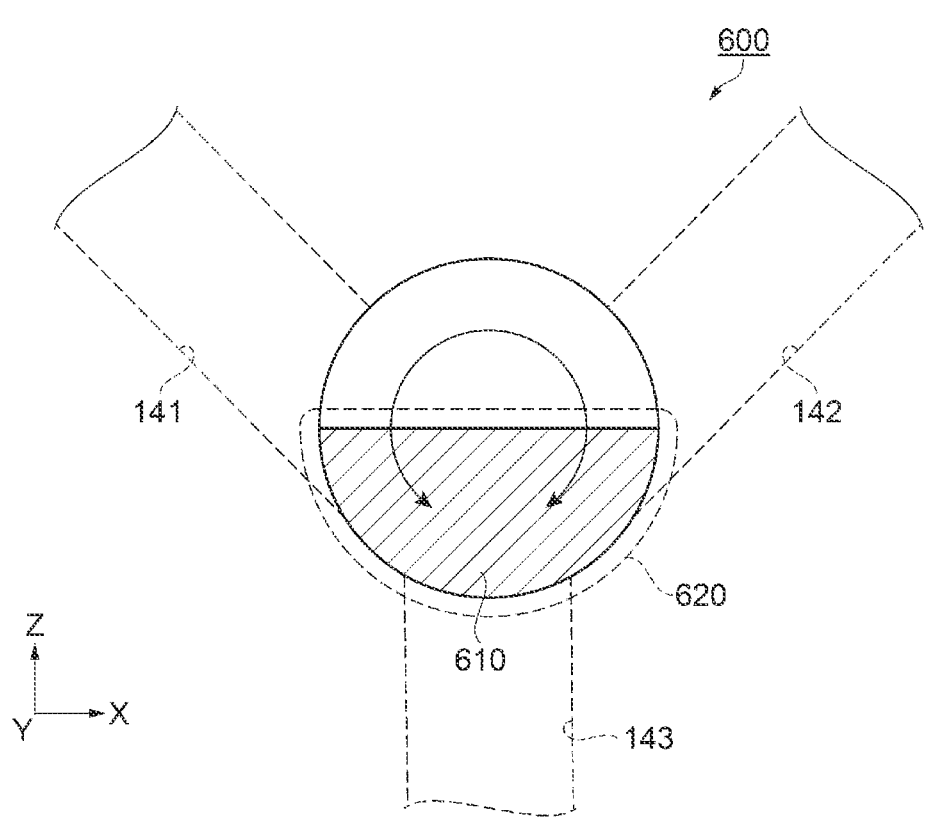
FIG. 3 is a cross-sectional view of a flow rate adjusting mechanism in FIG. 4 taken along a line A-A.
Figure 4:
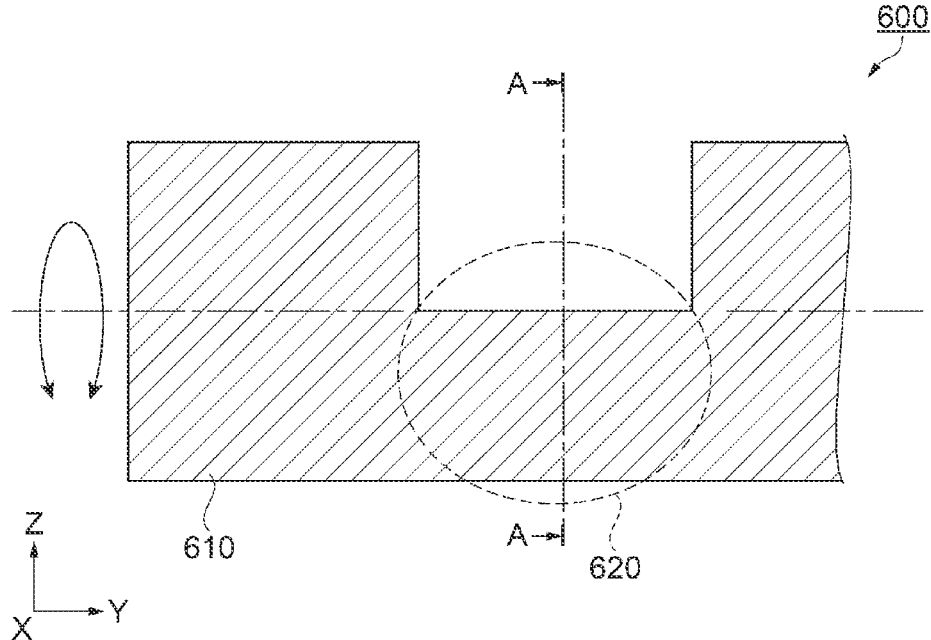
FIG. 4 is a cross-sectional view illustrating a configuration of the flow rate adjusting mechanism.

As illustrated in FIGS. 3 and 4, the flow rate adjusting mechanism 600 is disposed at the junction of the first flow path 141, the second flow path 142, and the third flow path 143 as described above. The flow rate adjusting mechanism 600 includes the drive shaft 610 and the butterfly valve 620.

In the flow rate adjusting mechanism 600, an orientation of the butterfly valve 620 is changed by the rotation of the drive shaft 610, and the first plasticized material 501 or the second plasticized material 502 that is the plasticized material 500 to be used can be selected. The flow rate adjusting mechanism 600 adjusts a rotation amount of the drive shaft 610, and thus can change the orientation of the butterfly valve 620 and control the flow rate of the plasticized material 500.

The drive shaft 610 is a rotatable and substantially rod-shaped member. As illustrated in FIG. 3, the butterfly valve 620 is a portion obtained by processing a part of the drive shaft 610 into a semicircular shape.

The drive shaft 610 is disposed along the direction intersecting the direction in which the third flow path 143 extends. As illustrated in FIG. 1, the drive shaft 610 is coupled to the drive motor 631. The drive shaft 610, that is, the butterfly valve 620 is rotated by a rotational driving force generated by the drive motor 631.

Next, a configuration of the pressure adjusting mechanism 700 will be described with reference to FIGS. 5 and 6.

Figures 5, 6:
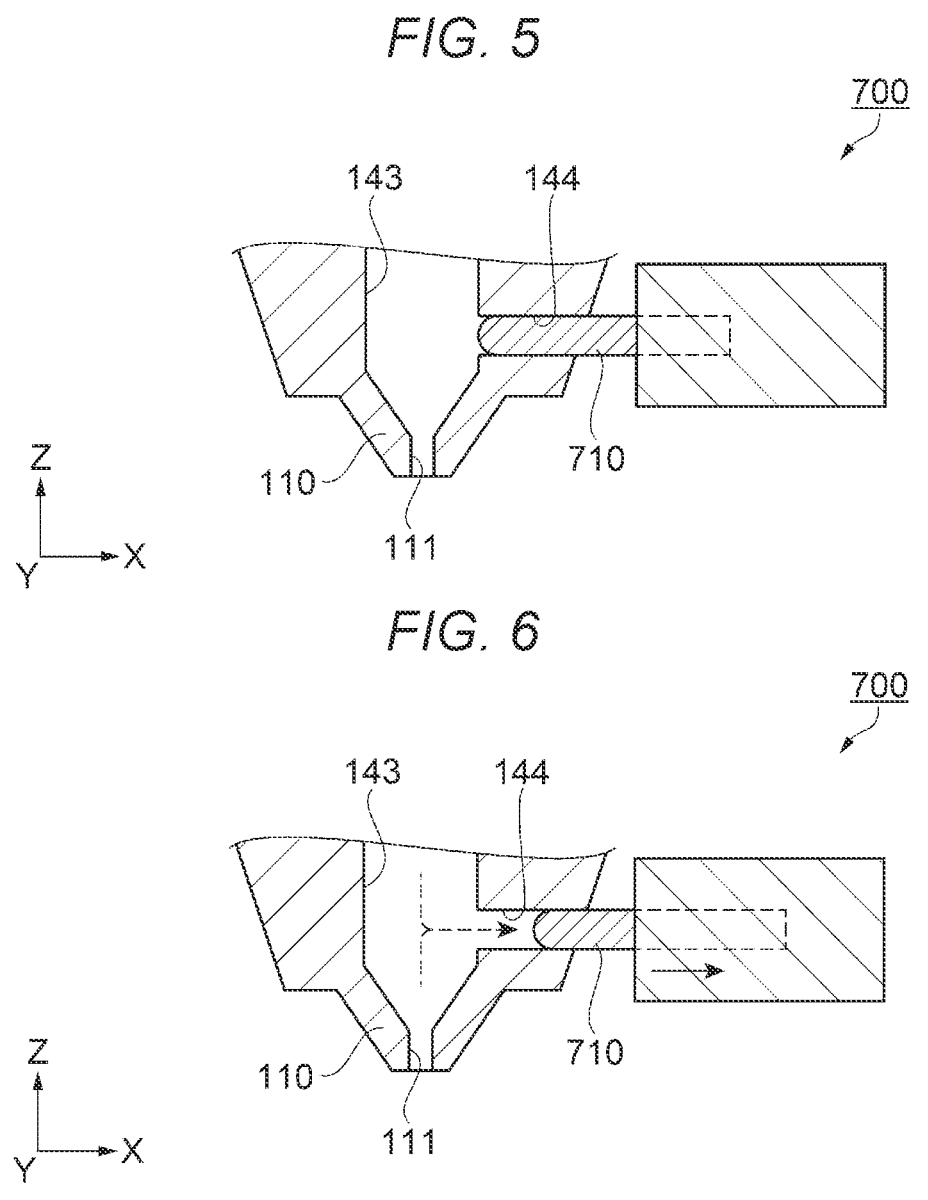

As illustrated in FIG. 5, the pressure adjusting mechanism 700 is disposed between the nozzle 110 and the flow rate adjusting mechanism 600 in the third flow path 143 as described above.

The pressure adjusting mechanism 700 has a function of adjusting a pressure in the third flow path 143. The pressure adjusting mechanism 700 includes a fourth flow path 144 branched from the third flow path 143, a rod 710 disposed in the fourth flow path 144, and the drive motor 632 (see FIG. 1) that slides the rod 710.

The fourth flow path 144 is a flow path into which a part of the plasticized material 500 flows. The rod 710 is a rod-shaped member that is disposed in the fourth flow path 144 and extends in the X direction.

Under the control of the control part 400, the drive motor 632 generates a driving force for instantaneously reciprocating the rod 710 in the fourth flow path 144. Specifically, the drive motor 632 slides the rod 710 such that a tip of the rod 710 is disposed in the third flow path 143 or the tip of the rod 710 is disposed in the fourth flow path 144.

That is, the control part 400 controls a moving speed of the rod 710 or a displacement amount of the rod 710. The drive motor 632 is not limited to a motor, and may be implemented by, for example, an actuator such as a solenoid mechanism or a piezo element.

As illustrated in FIG. 5, during a period in which the plasticized material 500 is discharged from the nozzle 110, the pressure adjusting mechanism 700 positions the rod 710 at an initial position where the tip thereof is positioned at a coupling portion of the third flow path 143 and the fourth flow path 144.

As illustrated in FIG. 6, when temporarily interrupting the discharge of the plasticized material 500 from the nozzle 110, the pressure adjusting mechanism 700 drives the tip of the rod 710 such that the tip of the rod 710 is instantaneously drawn into the fourth flow path 144 from the initial position. Accordingly, the pressure adjusting mechanism 700 can suck a part of the plasticized material 500 in the third flow path 143 to the fourth flow path 144, generate a negative pressure in the third flow path 143, and temporarily stop the outflow of the plasticized material 500 from the nozzle 110.

When resuming the discharge of the plasticized material 500 from the nozzle 110, the control part 400 causes the drive motor 632 to return the rod 710 to the initial position. Accordingly, the plasticized material 500 in the fourth flow path 144 flows out to the third flow path 143, and the pressure in the third flow path 143 is increased. Therefore, the outflow of the plasticized material 500 from the nozzle 110 can be quickly resumed.

In addition, the control part 400 causes the drive motor 632 to dispose the tip of the rod 710 in the third flow path 143, in other words, bring the tip of the rod 710 to protrude to the third flow path 143. In this way, the plasticized material 500 remaining in the fourth flow path 144 can be quickly discharged from the nozzle 110. Therefore, when the plasticized material 500 supplied to the nozzle 110 is switched to another plasticized material 500, it is possible to quickly stop the discharge of the plasticized material 500 from the nozzle 110.

Next, an operation of the butterfly valve 620 constituting the flow rate adjusting mechanism 600 will be described with reference to FIGS. 7 to 10. First, a method of switching the plasticized material 500 to be discharged from the first plasticized material 501 to the second plasticized material 502 will be described with reference to FIGS. 7 and 8.

Figures 7, 8:
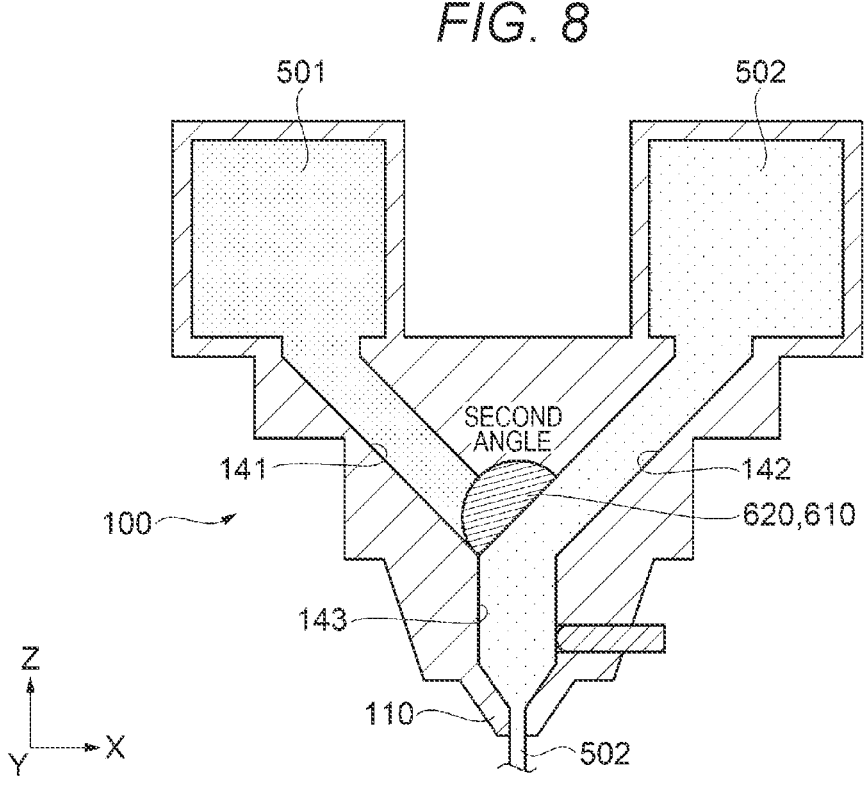
FIG. 7 is a cross-sectional view illustrating an operation of a butterfly valve at the time of material switching.
FIG. 8 is another cross-sectional view illustrating the operation of the butterfly valve at the time of material switching.

In a process illustrated in FIG. 7, the control part 400 controls a rotation angle of the drive motor 631 to displace the drive shaft 610 to a first angle that is an initial angle. Then, the orientation of the butterfly valve 620 enters an initial state, and the first flow path 141 and the third flow path 143 communicate with each other. Thus, the first plasticized material 501 is discharged from the nozzle 110. On the other hand, the second flow path 142 and the third flow path 143 are blocked by a surface of the butterfly valve 620 and are cut off from each other, and the second plasticized material 502 is not discharged.

In a process illustrated in FIG. 8, the control part 400 controls the rotation angle of the drive motor 631 to displace the drive shaft 610 from the first angle to a second angle. Then, the orientation of the butterfly valve 620 is changed, and the second flow path 142 and the third flow path 143 communicate with each other. Thus, the second plasticized material 502 is discharged from the nozzle 110. On the other hand, the first flow path 141 and the third flow path 143 are blocked, and the first plasticized material 501 is not discharged.

Next, a method of adjusting flow rates of the first plasticized material 501 and the second plasticized material 502 to be discharged will be described with reference to FIGS. 9 and 10.

Figure 9:
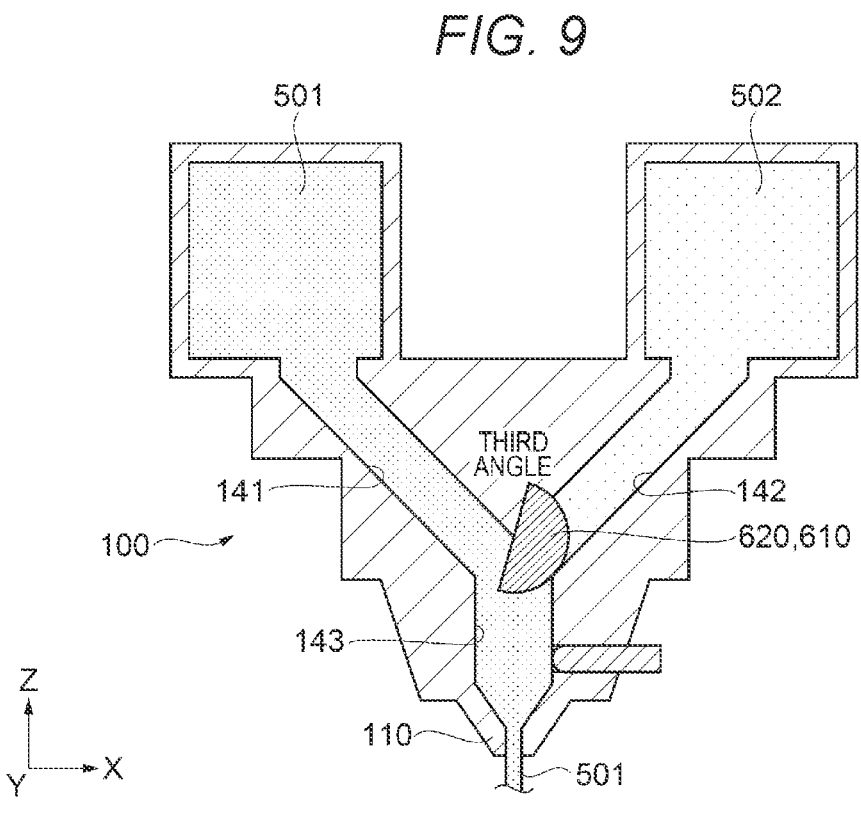
FIG. 9 is a cross-sectional view illustrating an operation of the butterfly valve at the time of flow rate adjustment.

In a process illustrated in FIG. 9, the control part 400 controls the rotation angle of the drive motor 631 to displace the drive shaft 610 to a third angle. Accordingly, the orientation of the butterfly valve 620 is changed, and an opening area from the first flow path 141 to the third flow path 143 is adjusted. By adjusting the opening area, the flow rate of the first plasticized material 501 is adjusted.

Figure 10:
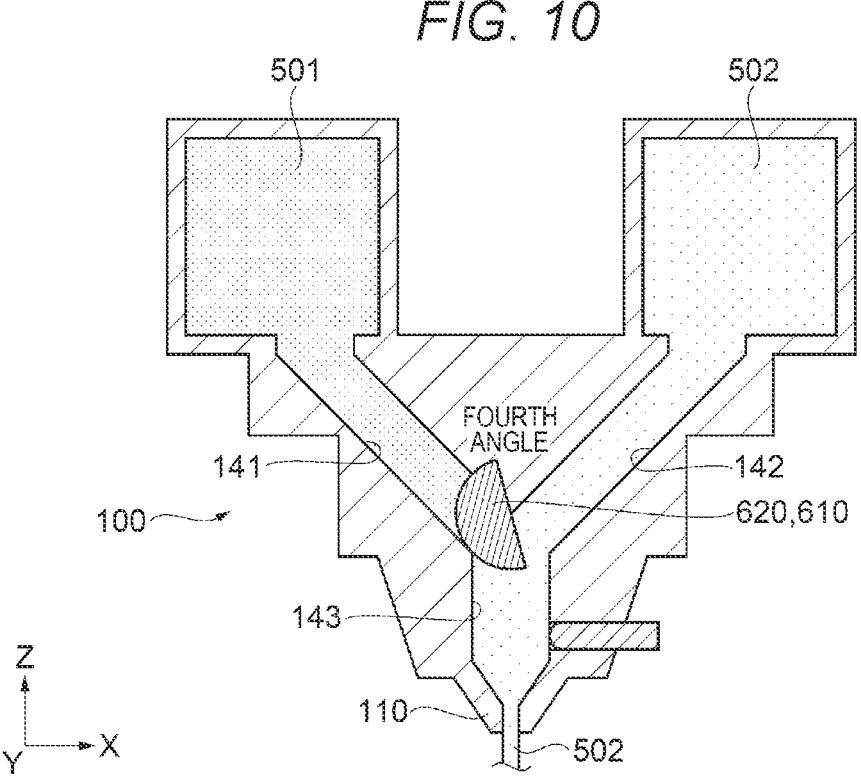
FIG. 10 is another cross-sectional view illustrating the operation of the butterfly valve at the time of flow rate adjustment.

In a process illustrated in FIG. 10, the control part 400 controls the rotation angle of the drive motor 631 to displace the drive shaft 610 to a fourth angle. Accordingly, the orientation of the butterfly valve 620 is changed, and an opening area from the second flow path 142 to the third flow path 143 is adjusted. By adjusting the opening area, the flow rate of the second plasticized material 502 is adjusted.

The control part 400 can also control a moving speed of the butterfly valve 620 by controlling a rotation speed of the drive motor 631. Accordingly, for example, a time of switching between the plasticized materials 501 and 502 can be changed or the flow rate adjustment can be changed according to the type of the plasticized material 500.

As described above, the plasticized material supply device 1000a of the embodiment is the plasticized material supply device 1000a used in the three-dimensional shaping device 1000. The plasticized material supply device 1000a includes: the nozzle 110 including the nozzle opening 111 and configured to discharge the plasticized material 500, which is obtained by plasticizing a thermoplastic resin, toward the stage 200; the first flow path 141 through which the first plasticized material 501 constituting the plasticized material 500 flows; the second flow path 142 through which the second plasticized material 502 constituting the plasticized material 500 flows; the third flow path 143 that communicates with the nozzle opening 111 and through which the plasticized material 500 flows; the flow rate adjusting mechanism 600 provided at a junction of the first flow path 141, the second flow path 142, and the third flow path 143 and configured to adjust a discharge amount of the plasticized material 500 from the nozzle 110; and the control part 400 configured to control the flow rate adjusting mechanism 600. The flow rate adjusting mechanism 600 includes the butterfly valve 620 formed by processing a part of the drive shaft 610 disposed along the direction intersecting the direction in which the third flow path 143 extends, and the drive motor 631 configured to rotate the butterfly valve 620 by rotating the drive shaft 610.

According to this configuration, the first flow path 141, the second flow path 142, the third flow path 143, and the nozzle 110 are integrated, and the flow rate adjusting mechanism 600 is provided at the junction thereof. Thus, as compared with a case where the paths communicate with respective nozzles, there no need to calibrate positions of the nozzles. Therefore, it is possible to prevent a large amount of material from being consumed when forming a calibration body for calibration, and it is possible to prevent a degradation in calibration accuracy caused by deformation of the calibration body.

In addition, in the plasticized material supply device 1000a of the embodiment, it is preferable that the pressure adjusting mechanism 700 is disposed between the nozzle 110 and the flow rate adjusting mechanism 600 in the third flow path 143, and the control part 400 controls the pressure adjusting mechanism 700. According to this configuration, by controlling the pressure adjusting mechanism 700 at a timing of supplying or stopping the plasticized material 500, the plasticized material 500 in the nozzle 110 can be drawn in or pushed out, and leakage of the plasticized material 500 from the nozzle 110 or remaining of the plasticized material 500 in the nozzle 110 can be prevented.

In the plasticized material supply device 1000a of the embodiment, it is preferable that the pressure adjusting mechanism 700 includes the fourth flow path 144 branched from the third flow path 143, the rod 710 disposed in the fourth flow path 144, and the drive motor 632 that slides the rod 710. The drive motor 632 preferably slides the rod 710 such that the tip of the rod 710 is disposed in the third flow path 143. According to this configuration, since the tip of the rod 710 is disposed in the third flow path 143, in other words, the tip of the rod 710 protrudes into the third flow path 143, it is possible to prevent the plasticized material 500 from remaining in the fourth flow path 144 after the plasticized material 500 supplied to the nozzle 110 is switched to another plasticized material 500.

In the plasticized material supply device 1000a of the embodiment, the control part 400 preferably controls a moving speed of the rod 710 or a displacement amount of the rod 710. According to this configuration, by changing the moving speed or the displacement amount of the rod 710 according to the type of the plasticized material 500, it is possible to prevent leakage of the plasticized material 500 from the nozzle 110 or remaining of the plasticized material 500 in the nozzle 110.

In the plasticized material supply device 1000a of the embodiment, the control part 400 preferably controls a moving speed of the butterfly valve 620 or a rotation angle of the butterfly valve 620 with respect to the direction in which the third flow path 143 extends. According to this configuration, a flow rate of the plasticized material 500 can be changed by changing the moving speed and the rotation angle of the butterfly valve 620, and a desired amount of the plasticized material 500 can be discharged from the nozzle 110.

The three-dimensional shaping device 1000 according to the embodiment includes: the plasticizing parts 130a and 130b configured to perform plasticization to obtain the plasticized material 500; the stage 200 including the shaping region 210 on which the plasticized material 500 is deposited; the head 100 configured to discharge the plasticized material 500 toward the shaping region 210; the moving mechanism 300 configured to move the head 100 relatively to the stage 200; and the control part 400. The head 100 includes the nozzle 110 including the nozzle opening 111 and configured to discharge the plasticized material 500, which is obtained by plasticizing a thermoplastic resin, toward the stage 200, the first flow path 141 through which the first plasticized material 501 flows, the second flow path 142 through which the second plasticized material 502 flows, the third flow path 143 that communicates with the nozzle opening 111 and through which the plasticized material 500 flows, and the flow rate adjusting mechanism 600 provided at a junction of the first flow path 141, the second flow path 142, and the third flow path 143 and including the butterfly valve 620 configured to adjust the discharge amount of the plasticized material 500 from the nozzle 110. The plasticizing parts 130a and 130b include the first plasticizing part 130a configured to supply the first plasticized material 501 to the first flow path 141, and the second plasticizing part 130b configured to supply the second plasticized material 502 to the second flow path 142.

According to this configuration, the first flow path 141, the second flow path 142, the third flow path 143, and the nozzle 110 are integrated, and the flow rate adjusting mechanism 600 is provided at the junction thereof. Thus, as compared with a case where the paths communicate with respective nozzles, there no need to calibrate positions of the nozzles. Therefore, it is possible to prevent a large amount of material from being consumed when forming a calibration body for calibration, and it is possible to prevent a degradation in calibration accuracy caused by deformation of the calibration body.

In the three-dimensional shaping device 1000 according to the embodiment, the pressure adjusting mechanism 700 is preferably disposed between the nozzle 110 and the flow rate adjusting mechanism 600 in the third flow path 143, and the control part 400 preferably controls the pressure adjusting mechanism 700. According to this configuration, by controlling the pressure adjusting mechanism 700 at a timing of supplying or stopping the plasticized material 500, the plasticized material 500 in the nozzle 110 can be drawn in or pushed out, and leakage of the plasticized material 500 from the nozzle 110 or remaining of the plasticized material 500 in the nozzle 110 can be prevented.

In the three-dimensional shaping device 1000 according to the embodiment, the pressure adjusting mechanism 700 preferably includes the fourth flow path 144 branched from the third flow path 143, the rod 710 disposed in the fourth flow path 144, and the drive motor 632 that slides the rod 710. The drive motor 632 preferably slides the rod 710 such that a tip of the rod 710 is disposed in the third flow path 143. According to this configuration, since the tip of the rod 710 is disposed in the third flow path 143, in other words, the tip of the rod 710 protrudes into the third flow path 143, it is possible to prevent the plasticized material 500 from remaining in the fourth flow path 144 after the plasticized material 500 supplied to the nozzle 110 is switched to another plasticized material 500.

In the three-dimensional shaping device 1000 according to the embodiment, the control part 400 preferably controls a moving speed of the rod 710 or a displacement amount of the rod 710. According to this configuration, by changing the moving speed or the displacement amount of the rod 710 according to the type of the plasticized material 500, it is possible to prevent leakage of the plasticized material 500 from the nozzle 110 or remaining of the plasticized material 500 in the nozzle 110.

In the three-dimensional shaping device 1000 according to the embodiment, the control part 400 preferably controls a moving speed of the butterfly valve 620 or a rotation angle of the butterfly valve 620 with respect to the direction in which the third flow path 143 extends. According to this configuration, a flow rate of the plasticized material 500 can be changed by changing the moving speed and the rotation angle of the butterfly valve 620, and a desired amount of the plasticized material 500 can be discharged from the nozzle 110.

What is claimed is:

1. A plasticized material supply device to be used in a three-dimensional shaping device, the plasticized material supply device comprising:
   a first material supply supplying a first plasticized material;
   a second material supply supplying a second plasticized material different from the first plasticized material;
   a nozzle including a nozzle opening and configured to discharge one of the first and second plasticized materials toward a stage;
   a first flow path through which the first plasticized material flows;
   a second flow path through which the second plasticized material flows;
   a junction at which an end of the first flow path and an end of the second flow path meet;
   a third flow path that is located between the junction and the nozzle, communicates with the nozzle opening, and through which one of the first and second plasticized materials flows;
   a flow rate adjusting assembly provided at the junction, the flow rate adjusting assembly having a butterfly valve, a drive shaft connecting the butterfly valve, and a motor configured to rotate the drive shaft, the motor being configured to move the butterfly valve so as to:

switch between a first state and a second state, only the first plasticized material flowing in the first state, only the second plasticized material flowing in the second state; and
   adjust a discharge amount of a corresponding one of the first and second plasticized materials from the nozzle;
   a memory configured to store a program and shaping data, the shaping data including a movement path of the nozzle with respect to the stage, an amount of one of the first and second plasticized materials to be discharged from the nozzle, and a shape of each of a plurality of shaping layers constituting a three-dimensional shaped object; and
   a processor configured to execute the program using the shaping data so as to:
      cause the motor to rotate the drive shaft such that the butterfly valve is located at a first position as the first state; and
      cause the motor to rotate the drive shaft such that the butterfly valve is located at a second position as the second state,
      wherein an extending direction of the drive shaft of the flow rate adjusting assembly intersects an extending direction of the third flow path.

2. The plasticized material supply device according to claim 1, wherein
   a pressure adjusting assembly is disposed between the nozzle and the flow rate adjusting assembly in the third flow path, the pressure adjusting assembly has a rod and a drive motor driving the rod, and a tip of the rod faces the third flow path, and
   the processor is further configured to control the pressure adjusting assembly.

3. The plasticized material supply device according to claim 2, wherein
   the pressure adjusting assembly includes a fourth flow path branched from the third flow path, the rod disposed in the fourth flow path, and the drive motor configured to slide the rod, and
   the drive motor is configured to slide the rod such that a tip of the rod is disposed in the third flow path.

4. The plasticized material supply device according to claim 3, wherein
   the processor is configured to control a moving speed of the rod or a displacement amount of the rod.

5. The plasticized material supply device according to claim 1, wherein
   the processor is configured to control a moving speed of the butterfly valve or a rotation angle of the butterfly valve with respect to the extending direction of the third flow path.

6. A three-dimensional shaping device comprising:
   a plasticizing assembly configured to plasticize first and second materials to form first and second plasticized materials, respectively;
   a stage including a shaping region on which the first and second plasticized materials are selectively deposited;
   a discharge head configured to selectively discharge one of the first and second plasticized materials toward the shaping region;
   a motor configured to move the discharge head relatively to the stage;
   a memory configured to storer a program and shaping data, the shaping data including a movement path of a nozzle with respect to the stage, an amount of one of the first and second plasticized materials to be discharged from the nozzle, and a shape of each of a plurality of shaping layers constituting a three-dimensional shaped object; and a processor configured to execute the program using the shaping data, wherein the discharge head includes:

a first material supply supplying the first plasticized material;

a second material supply supplying the second plasticized material different from the first plasticized material;

the nozzle including a nozzle opening and configured to discharge one of the first and second plasticized materials toward the stage;

a first flow path through which the first plasticized material flows;

a second flow path through which the second plasticized material flows;

a junction at which an end of the first flow path and an end of the second flow path meet;

a third flow path that is located between the junction and the nozzle, communicates with the nozzle opening, and through which one of the first and second plasticized materials flows;

a flow rate adjusting assembly provided at the junction, the flow rate adjusting assembly having a butterfly valve, a drive shaft connecting the butterfly valve, and a motor configured to rotate the drive shaft, the motor being configured to move the butterfly valve so as to:

switch between a first state and a second state, only the first plasticized material flowing in the first state, only the second plasticized material flowing in the second state; and adjust a discharge amount of a corresponding one of the first and second plasticized materials from the nozzle, the processor is further configured to execute the program using the shaping data so as to:

cause the motor to rotate the drive shaft such that the butterfly valve is located at a first position as the first state; and cause the motor to rotate the drive shaft such that the butterfly valve is located at a second position as the second state, and an extending direction of the drive shaft of the flow rate adjusting assembly intersects an extending direction of the third flow path.

7. The three-dimensional shaping device according to claim 6, wherein a pressure adjusting assembly is disposed between the nozzle and the flow rate adjusting assembly in the third flow path, the pressure adjusting assembly has a rod and a drive motor driving the rod, and a tip of the rod faces the third flow path, and the processor is further configured to control the pressure adjusting assembly.

8. The three-dimensional shaping device according to claim 7, wherein the pressure adjusting assembly includes a fourth flow path branched from the third flow path, the rod disposed in the fourth flow path, and the drive motor configured to slide the rod, and the drive motor is configured to slide the rod such that a tip of the rod is disposed in the third flow path.

9. The three-dimensional shaping device according to claim 8, wherein the processor is configured to control a moving speed of the rod or a displacement amount of the rod.

10. The three-dimensional shaping device according to claim 6, wherein the processor is configured to control a moving speed of the butterfly valve or a rotation angle of the butterfly valve with respect to the extending direction of the third flow path.

* * * * *